Oct. 28, 1958     H. JOSEPH     2,857,620
SHRIMP SHELLER AND DEVEINER
Filed July 10, 1957
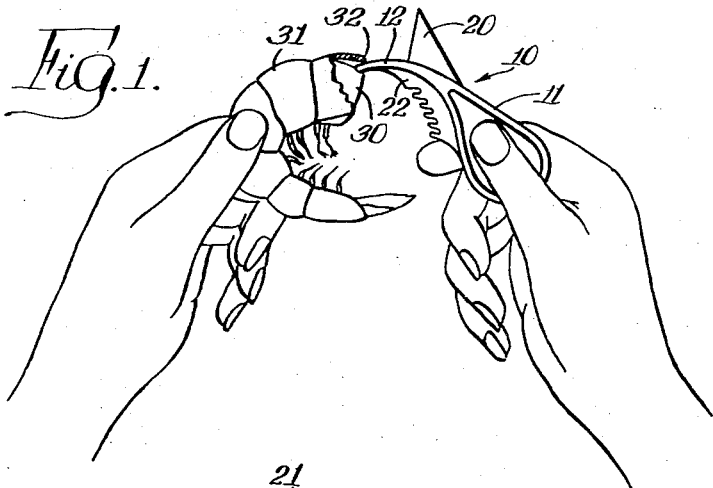
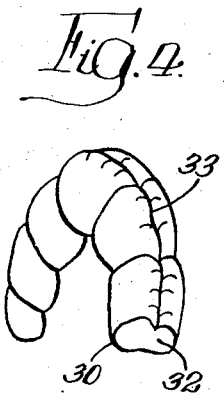
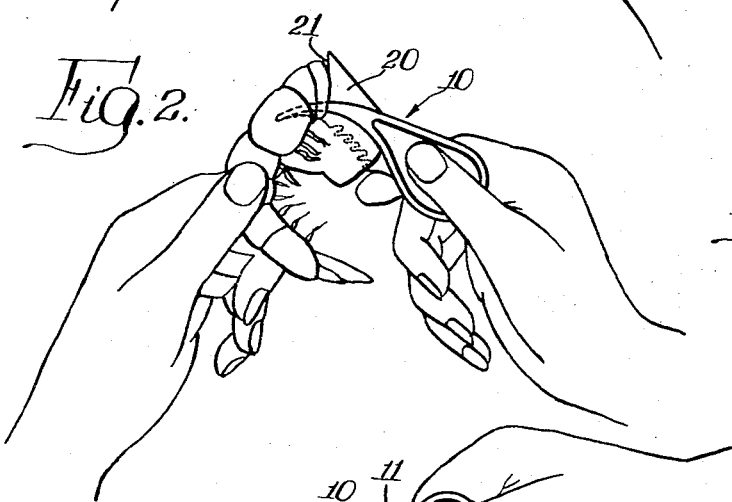
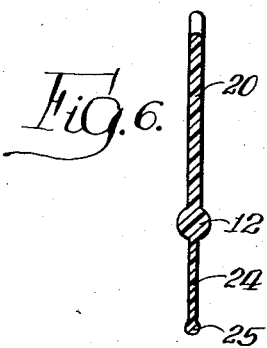
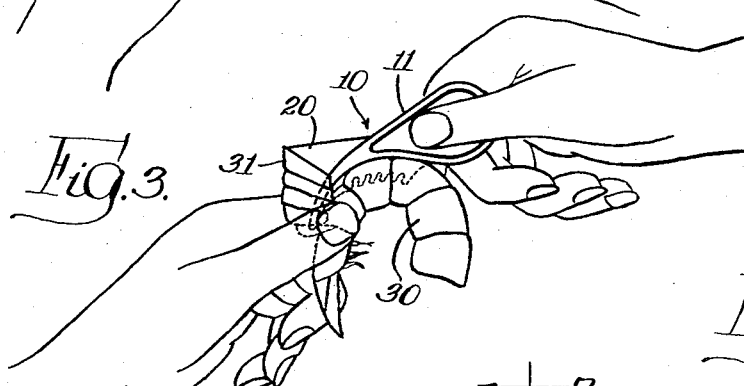
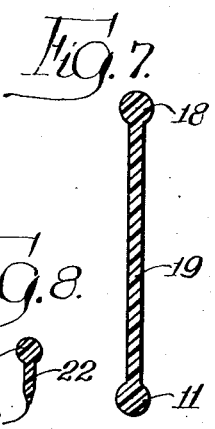
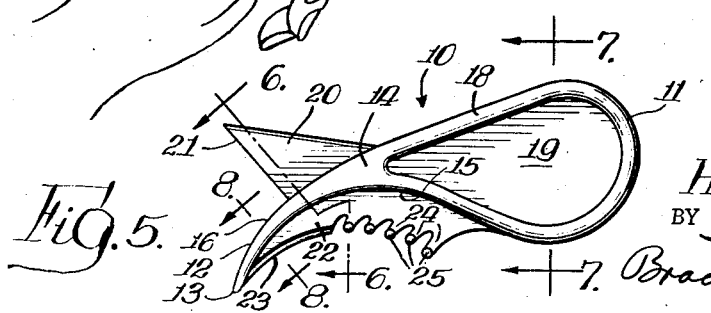
INVENTOR.
*Henry Joseph*
BY *Schroeder, Hofgren,*
*Brady & Wegner.* Attys.

United States Patent Office 2,857,620
Patented Oct. 28, 1958

2,857,620

SHRIMP SHELLER AND DEVEINER

Henry Joseph, New Orleans, La.

Application July 10, 1957, Serial No. 671,017

7 Claims. (Cl. 17—7)

This invention relates to a shrimp sheller and deveiner, herein for convenience called a shrimp cleaner, which is particularly adapted for use on cooked shrimp. The present application is a continuation in part of my co-pending application Serial No. 645,763, filed March 13, 1957, now abandoned.

The principal object of the invention is to provide a shrimp cleaner for quickly and efficiently removing the shell and the sand vein of a shrimp, and particularly a cooked shrimp.

Another object of the invention is to provide a one-piece implement which may be fabricated from metal, plastic or other suitable material, with which the shell and vein of a cooked shrimp may be quickly and easily removed.

A further object of the invention is to provide a shrimp cleaner having a guide prong, or spur, at the front which may penetrate the meat of a shrimp along the back of the shell, and having an upstanding, blunt abutment which bears on the decapitated end of the shell to roll the shell back and push it off the body of the shrimp.

Yet another object of the invention is to provide a shrimp cleaner in which a guide spur has a shallow cutting blade along its lower margin to split the shrimp meat down to the sand vein, and a series of bulbous-ended teeth to the rear of the blade which may traverse the sand vein and push the vein out of the body of the shrimp.

The invention is illustrated in a preferred embodiment in the accompanying drawings in which:

Fig. 1 shows a shrimp cleaner as it begins to enter beneath the back of the shell of a cooked shrimp, the rear portion of the shell being broken away for clarity of illustration;

Fig. 2 shows the device as it advances along the shrimp body and the upstanding blunt, abutment pushes the shell off the shrimp body;

Fig. 3 is a view similar to Fig. 2 with the shell almost entirely removed from the body of the shrimp, and the sand vein penetrated by the cutting blade and teeth;

Fig. 4 is a perspective view of a cleaned, cooked shrimp after it has been cleaned with the device of the invention;

Fig. 5 is a side elevational view of a shrimp cleaner embodying the invention; and Figs. 6, 7 and 8 are enlarged sectional views taken as indicated, respectively, along the lines 6—6, 7—7 and 8—8 of Fig. 5.

Referring to the drawings in greater detail, and referring first to Figs. 5 to 8 inclusive, the shrimp cleaner consists of a body portion indicated generally by the reference numeral 10, said body portion having a handle 11 at the rear and a guide spur 12 at the front which has a pointed tip 13 extending into a generally cylindrical arcuate spur, the rear end portion 14 of which has a lower margin 15 and an upper margin 16 which are curved substantially to conform to the curvature of the back of a cooked shrimp. The lower and upper margins of the spur 12 merge smoothly into a bead like rim 18 which forms the margin of a very thin finger piece 19 which may be easily grasped between the thumb and index finger.

Surmounting the spur 12 is an upstanding abutment member 20 which has a blunt forward face 21 which is positioned about half way back on the spur.

The bottom of the spur is provided with a depending blade 22 which has an arcuate lower margin 23 providing a cutting edge which is seen in Fig. 8 to be sharpened.

To the rear of the cutting blade 22 is a series of teeth 24 the lower ends of which are provided with globular beads 25 the lower margins of which are substantially on a projection rearwardly of the curve of the cutting edge 23 of the blade. Thus, the globular beads 25 provide bulbous ends for the teeth 24 which eliminate the tendency of the teeth to cut into the body of the shrimp below the sand vein, and which tend to catch the sand vein and carry it with the cleaner, instead of tearing it up and leaving bits of it in the shrimp.

Referring now to Figs. 1, 2 and 3, a shrimp 30 has a shell 31 with a flat, severed end 32 where the shrimp has been decapitated. As seen in Fig. 1, the spur 12 is inserted beneath the shell 31 at the back of the shrimp body, and is slid between the shell and the body to bring the blunt abutment surface 21 of the upstanding abutment member 20 against the cutoff head end 32 of the shell. As seen in Fig. 2, this causes the shell to be pushed upwardly and rearwardly away from the shrimp body, the operation being a sort of rolling action which breaks the shell away a section at a time; and at the same time the blade 22 cuts into the meat of the shrimp to form a slit 33 (see Fig. 4) which extend downwardly into the sand vein. The bulbous ends 25 of the teeth 24 slide along the sand vein, thereby catching the vein and carrying it rearwardly with the shrimp cleaning device. Ultimately, as seen in Fig. 3, the shell 31 is pushed off the tail of the shrimp, leaving the entire shrimp including the tail meat intact. The sand vein is carried out by the bulbous-ended teeth 24 substantially intact, and may be readily removed from the teeth before the device is used to clean another shrimp.

The foregoing detailed description is given for clearness of understanding only and no unnecessary limitations should be understood therefrom, as modifications will be obvious to those skilled in the art.

I claim:

1. A shrimp cleaner comprising: a body having a handle at the rear and a spur at the front; an upstanding abutment surmounting the body, said abutment having a forwardly facing, blunt thrusting face substantially perpendicular to the spur; a depending blade on the body; and a series of teeth on the body to the rear of the blade, said spur being adapted to move along the body of a shrimp immediately beneath the back of the shell, while said abutment pushes against the back of the shell to drive the shell rearwardly and break it away from the meat section by section.

2. A shrimp cleaner comprising: a body having a handle at the rear and a spur at the front; an upstanding abutment surmounting the body, said abutment having a forwardly facing, blunt thrusting face substantially perpendicular to the spur; and depending vein removing means on the body, said spur being adapted to move along the body of a shrimp immediately beneath the back of the shell, while said abutment pushes against the back of the shell to drive the shell rearwardly and break it away from the meat section by section.

3. A shrimp cleaner comprising: a body having a handle at the rear and a spur at the front; an upstanding abutment on the body, said abutment having a forwardly facing, blunt thrusting face substantially perpendicular to the spur; a depending blade on the body; and a series of bulbous-ended teeth on the body to the rear of the blade, said spur being adapted to move along the body of a shrimp immediately beneath the back of the shell, while said abutment pushes against the back of the shell to drive the shell rearwardly and break it away from the meat section by section.

4. A shrimp cleaner for cooked shrimp comprising: a body having a handle at the rear and an arcuate spur at the front which is curved to conform substantially to the curvature along the back of a cooked shrimp, the lower margin of said spur merging into the lower margin of the handle; an upstanding abutment on the body, said abutment having a forwardly facing, blunt thrusting face substantially perpendicular to the spur; a depending blade extending rearwardly from the tip of the spur and increasing in height toward the rear, said blade having a curved lower edge; and a series of bulbous-ended teeth on the body to the rear of the blade, the lower ends of said teeth being on a projection of the curve of the lower edge of the blade, said spur being adapted to move along the body of a shrimp immediately beneath the back of the shell, while said abutment pushes against the back of the shell to drive the shell rearwardly and break it away from the meat section by section.

5. A shrimp cleaner for cooked shrimp comprising: a body having a handle at the rear and an arcuate spur at the front which is curved to conform substantially to the curvature along the back of a cooked shrimp; an upstanding abutment surmounting the body, said abutment having a forwardly facing, blunt thrusting face substantially perpendicular to the spur; and depending vein removing means on the body, said spur being adapted to move along the body of a shrimp immediately beneath the back of the shell, while said abutment pushes against the back of the shell to drive the shell rearwardly and break it away from the meat section by section.

6. A shrimp cleaner for cooked shrimp comprising: a body having a handle at the rear and an arcuate spur at the front which is curved to conform substantially to the curvature along the back of a cooked shrimp, said spur being substantially circular in cross section; an upstanding abutment surmounting the body, said abutment having a forwardly facing, blunt thrusting face substantially perpendicular to the spur; and depending vein removing means on the body, said spur being adapted to move along the body of a shrimp immediately beneath the back of the shell, while said abutment pushes against the back of the shell to drive the shell rearwardly and break it away from the meat section by section.

7. A shrimp cleaner for cooked shrimp comprising: a body having a handle at the rear and an arcuate spur at the front which is curved to conform substantially to the curvature along the back of a cooked shrimp, said spur being substantially circular in cross section; an upstanding abutment surmounting the body, said abutment having a forwardly facing, blunt thrusting face substantially perpendicular to the spur; and depending vein removing means on the body, said vein removing means including a series of teeth the lower ends of which are substantially globular in shape, said spur being adapted to move along the body of a shrimp immediately beneath the back of the shell, while said abutment pushes against the back of the shell to drive the shell rearwardly and break it away from the meat section by section.

References Cited in the file of this patent

UNITED STATES PATENTS

| | | |
|---|---|---|
| 2,203,169 | Lovgren | June 4, 1940 |
| 2,541,781 | Riha | Feb. 13, 1951 |
| 2,561,359 | Gorton | July 24, 1951 |
| 2,647,278 | Weinberger | Aug. 4, 1953 |
| 2,648,094 | Paoli | Aug. 11, 1953 |
| 2,792,590 | Stone | May 21, 1957 |